(12) United States Patent
Connor et al.

(10) Patent No.: US 7,349,949 B1
(45) Date of Patent: Mar. 25, 2008

(54) SYSTEM AND METHOD FOR FACILITATING DEVELOPMENT OF A CUSTOMIZABLE PORTLET

(75) Inventors: Kathy R. Connor, Kittery Point, ME (US); Joseph A. Pescatello, Rye, NH (US); Paul H. Orsillo, Kittery Point, ME (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 10/330,004

(22) Filed: Dec. 26, 2002

(51) Int. Cl.
*G06F 15/16* (2006.01)

(52) U.S. Cl. .................. 709/217; 709/200; 709/203

(58) Field of Classification Search ............ 709/200, 709/203, 217
See application file for complete search history.

(56) References Cited

U.S. PATENT DOCUMENTS

| | | | |
|---|---|---|---|
| 5,201,046 A | 4/1993 | Goldberg et al. | 395/600 |
| 5,615,361 A | 3/1997 | Leung et al. | 395/603 |
| 5,757,920 A | 5/1998 | Misra et al. | 380/25 |
| 5,768,503 A | 6/1998 | Olkin | 395/187.01 |
| 5,806,079 A | 9/1998 | Rivette et al. | 707/512 |
| 5,822,750 A | 10/1998 | Jou et al. | 707/2 |
| 5,870,747 A | 2/1999 | Sundaresan | 707/101 |
| 5,875,296 A | 2/1999 | Shi et al. | 395/188.01 |
| 5,899,986 A | 5/1999 | Ziauddin | 707/2 |
| 5,913,061 A | 6/1999 | Gupta et al. | 395/680 |
| 5,931,900 A | 8/1999 | Notani et al. | 709/201 |
| 5,940,819 A | 8/1999 | Beavin et al. | 707/2 |
| 5,944,824 A | 8/1999 | He | 713/201 |
| 5,960,200 A | 9/1999 | Eager et al. | 395/705 |
| 5,995,597 A | 11/1999 | Woltz et al. | 379/93.24 |
| 6,000,033 A | 12/1999 | Kelley et al. | 713/201 |
| 6,003,065 A | 12/1999 | Yan et al. | 709/201 |
| 6,006,214 A | 12/1999 | Carey et al. | 707/2 |
| 6,021,496 A | 2/2000 | Dutcher et al. | 713/202 |
| 6,065,120 A | 5/2000 | Laursen et al. | 713/201 |
| 6,078,924 A | 6/2000 | Ainsbury et al. | 707/101 |
| 6,078,926 A | 6/2000 | Jensen et al. | 707/103 |
| 6,088,451 A | 7/2000 | He et al. | 380/25 |
| 6,091,412 A | 7/2000 | Simonoff et al. | 345/335 |
| 6,122,639 A | 9/2000 | Babu et al. | 707/103 |
| 6,128,738 A | 10/2000 | Doyle et al. | 713/185 |
| 6,145,086 A | 11/2000 | Bellemore et al. | 713/202 |

(Continued)

FOREIGN PATENT DOCUMENTS

| | | |
|---|---|---|
| EP | 991242 A | 4/2000 |
| JP | 409034838 A | 2/1997 |
| JP | 11025048 A | 1/1999 |
| JP | 2000174807 | 6/2000 |

OTHER PUBLICATIONS

Article 41387, Usage of UNC Names with DFS Web Secure for Windows NT, Research Disclosure, Sep. 1998.

(Continued)

*Primary Examiner*—William Vaughn
*Assistant Examiner*—Ranodhi Serrao
(74) *Attorney, Agent, or Firm*—Dreier LLP; Seth H. Ostrow

(57) ABSTRACT

The method disclosed herein presents systems and methods for facilitating development of a customizable portlet. The invention comprises receiving requested content information, merging presentation information with the requested content information to form merged information and rendering the merged information in the customizable portlet.

16 Claims, 6 Drawing Sheets

U.S. PATENT DOCUMENTS

| | | | |
|---|---|---|---|
| 6,154,751 A | 11/2000 | Ault et al. | 707/201 |
| 6,157,953 A | 12/2000 | Chang et al. | 709/225 |
| 6,178,511 B1 | 1/2001 | Cohen et al. | 713/201 |
| 6,327,628 B1* | 12/2001 | Anuff et al. | 719/311 |
| 2001/0009016 A1* | 7/2001 | Hofmann et al. | 709/219 |
| 2001/0034771 A1* | 10/2001 | Hutsch et al. | 709/217 |
| 2002/0023158 A1* | 2/2002 | Polizzi et al. | 709/227 |
| 2002/0116511 A1* | 8/2002 | Boehme et al. | 709/230 |
| 2003/0055878 A1* | 3/2003 | Fletcher et al. | 709/203 |
| 2004/0010598 A1* | 1/2004 | Bales et al. | 709/228 |

OTHER PUBLICATIONS

Article 429128, Servlet/Applet/HTML Authentication Process With Single Sign-on, Research Disclosure, Jan. 2000.

IEEE Wireless Communications and Networking Conference, (Cat. No. 99TH8466), Pt. vol. 3, pp. 1397-1401, vol. 3, Published: Piscataway, NJ, USA, 1999.

US 6,021,479, 02/2000, Stevens (withdrawn)

* cited by examiner

SYSTEM AND METHOD FOR FACILITATING DEVELOPMENT OF A CUSTOMIZABLE PORTLET

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

This application is related to, and hereby incorporates by reference, each of the following: U.S. application Ser. No. 09/760,612, filed Jan. 16, 2001, entitled "Method And System For System For Virtualizing Logic Between Disparate Systems", U.S. application Ser. No. 09/881,374, filed Jun. 14, 2001, entitled "Method And System For Providing Access To Computer Resources That Utilize Distinct Protocols For Receiving Security Information And Providing Access Based On Received Security Information", U.S. application Ser. No. 10/104,999, filed Mar. 22, 2002, entitled "Centralized Mapping Of Security Credentials For Database Access Operations", U.S. application Ser. No. 09/877,609, filed Jun. 8, 2001, entitled "Method For Processing External Data For Access And Manipulation Through A Host Operating Environment", U.S. application Ser. No. 09/877,513, filed Jun. 8, 2001, entitled "Virtualizing External Data As Native Data", U.S. application Ser. No. 10/114,633, filed Apr. 1, 2002, entitled "Method And System For Virtualizing Metadata Between Disparate Systems", U.S. application Ser. No. 10/051,802, filed Jan. 17, 2002, entitled " Portlet Builder System For Processing Client-Neutral Networked Applications", and U.S. application Ser. No. 10/330,006, file concurrently herewith, entitled "System and Method for Facilitating Access to Content Information".

BACKGROUND OF THE INVENTION

The present invention discloses systems and methods for facilitating the development of a customizable portlet, facilitating access to content information, and managing an access contract between a client and a data service provider.

Portals provide a secure, single point of access to diverse information and applications that are personalized to the needs of their users. Portals typically provide a variety of services including, but not limited to, Web searching, news, white and yellow pages directories, e-mail, discussion groups, online shopping and links to other sites. Portals are increasingly being used as points to disseminate information particular to a specific industry such as banking, insurance, or computer technology, for example. Corporate portals also often include information relevant to a specific company, such as intranet information, and links to other information sources relevant to the company's business.

Portals, in turn, may comprise a plurality of portlets. Portlets are applications, typically executed or presented in the context of a portal, that perform one or more specific functions. Creating these highly customizable applications that run over a network, however, has traditionally been a difficult and resource-intensive effort requiring many hours of programming and configuration effort. Moreover, the ubiquitous accessibility of the Internet and the popularity of corporate and enterprise portals has increased the demand for portlets whose level of difficulty to modify is low. Users of Enterprise Resource Planning (ERP) systems have in particular required to endure a prescribed portlet format and difficult user-interface to perform even the simplest tasks. Further, the ability of a user to customize a portlet has been extremely limited, often requiring modifications to be made from a position local to the server or other host computer.

The present invention addresses these and other problems.

SUMMARY OF THE INVENTION

The present invention provides for a method and system where the responsibilities of data access and retrieval, data presentation, and data security are separated into multiple modular components. By separating the components of business logic, presentation, and connectivity, and presenting the exposed characteristics in a standard point and click interface, a portal end user can mix and match portlet characteristics as preferred. The user interface is logical, easy-to-use, and in some embodiments, non-programmatic. While portlets are individual sets of functionality that perform a specific function, the invention enables the creation of declarative portlets through a set of intercommunicating modules, which take generalized business logic and allow for multiple levels of customization. The present invention also includes a method and system for developing an environment for the declarative development of portlets and for the orchestration of web service flows.

In one embodiment, the method and system provides content information, presentation, and security management modules, which are swappable or exchangeable to allow for a variety of solutions. In one embodiment, the method and system provides controls for customizing, e.g., building or tailoring, portlets, web services, etc. This modular design supports portlet development and the declarative development of web services, mobile applications, etc.

Advantages of portlets developed using the techniques described herein include customizability and portability since the presentation of a portlet is separated from the data interaction and logic. The functionality of a portlet is defined by a configuration or specification, which is customizable, for example, by an administrator, for browsing a content source, configuring security, and the like. The resulting configuration or specification is then made available to the employees or customers. These employees or customers may choose to further customize the portlet for use in their specific pages, e.g., by filtering data, arranging or formatting.

The present invention provides a method for facilitating development of a customizable portlet. The method comprises receiving requested content information and merging specified presentation information with the requested content information to form merged information adapted to be rendered in the customizable portlet. In one embodiment, the present invention comprises rendering the customizable portlet on a client display device. The rendered portlet may be displayed as part of a portal, in its own screen, or in an administrative screen. The modules may be swappable, for example, an information broker or other data access and content-retrieval modules may be exchanged for an alternative content-retrieval module or modules.

In one embodiment, the portlet is customizable by a client, such as a user, administrator, or any other individual responsible for or interested in an aspect of portal customization. A client requests the content and presentation information, although the same client or a different client that specifies the presentation information may request content information. Further, the client that requests the requested content information or the client that specifies the presentation information can be the same or different as the end user client. In one embodiment, a presentation module ascertains the presentation vehicle at run-time based on properties of an associated client. Such presentation vehicle may include, for example, an HTML-based browser, a WML-compatible wireless device, a conduit for a web service, etc.

An authentication module or functionality may be provided. A credential broker, for example, manages circumstances under which users may access certain resources. In one embodiment, the authentication functionality involves the receipt of a request and a user-associated token from a user and associating the user-associated token with credentials associated with the user. A request for content information is passed to a corresponding data service provider if the credentials associated with the user indicate that user access is authorized. The authentication functionality may comprise passing the request to a data service provider corresponding to the request, and providing the requested content information if the data service provider indicates that user access is authorized.

Also provided by the present invention is a system for facilitating development of a customizable portlet. The system comprises a presentation module configured to receive specified presentation information, a content-retrieval module, and a director module configured to provide the presentation module with requested content information from the content-retrieval module. The presentation module is configured to merge the requested content information and specified presentation information to form merged information to be rendered in the customizable portlet. In one embodiment the content-retrieval module is swappable. Alternatively, the requested content information may comprise client-requested content information and the specified presentation information may comprise client-specified presentation information.

The merged information may be accessible at a server and configured to be rendered in a client display. The merged information may therefore be rendered in a client-customizable portlet, a portal screen, or administration screen. The merged information may preferably be rendered in at least one of an HTML-based browser and a WML-compatible wireless device. The presentation module is configured to ascertain the presentation application or module being used at run-time based on properties of an associated client. In one embodiment, the director module implements a scenario chosen from a group of at least one scenario.

A credential module may be provided and configured to receive a request for content information and a user-associated token from a user, associate the user-associated token with credentials associated with the user, and block passage of the request to a corresponding data service provider if the credentials associated with the user indicate that user access is unauthorized. The system is further configured to allow the data service provider to reject the service request when the data service provider identifies that user access is unauthorized.

The present invention also provides a method for facilitating access to content information. The method comprises receiving a request for content information, choosing at least one data service provider access object that is configured to access a data service provider responsive to the request, and assigning the chosen data service provider access object to the request. Choosing may comprise choosing a pluggable data service provider access object from a group of one or more pluggable data service provider access objects. In one embodiment, the method comprises identifying the data service provider associated with the request from a group of one or more data service providers. The data service provider access object may be accessed either locally or remotely.

The method comprises accessing the data service provider with the chosen data service provider access object, which may also comprise authenticating access rights. The associated data service provider for which access is sought may perform authentication. Alternatively, multiple authentication schemes may be utilized by the invention. The method comprises retrieving the content information from the data service provider with the chosen data service provider access object, and may further comprise transmitting the content information to a module configured to merge the content information with presentation information, thereby forming information for rendering by a rendering application.

The method provided herein also manages an access contract between a client and a data service provider. The method comprises identifying the client and assigning use of a data service provider access object associated with the data service provider to the client for the duration of the access contract. The method comprises notifying the client when the access contract is expired or about to expire. In one embodiment, the method comprises canceling the assignment to the client after the access contract expires. Alternatively, the method comprises identifying another client having an access contract with the data service provider and reassigning use of the data service provider access object to the another client for the duration of the access contract between the another client and the data service provider.

Also provided herein is a system for facilitating access to content information. The system comprises a management module configured to receive a request for content information and a data service provider access object that is configured to access a data service provider associated with the request. The management module chooses a the data service provider access object from a group of at least one data service provider access object and assigns the chosen data service provider access object to the request. In one embodiment, the data service provider access object comprises a pluggable data service provider access object, which may be local or remote to the management module.

In one embodiment, the management module is configured to identify the data service provider associated with the request from a group comprising at least one data service provider wherein the chosen data service provider access object is configured to access the data service provider. The chosen data service provider access object is preferably configured to retrieve the content information from the data service provider. The management module transmits the content information from the data service provider access object to a module configured to merge the content information with presentation information, thereby forming information that may be rendered on a client device.

The system is compatible with one or more authentication schemes associated with the data service provider. In one embodiment, the system is provided with an authentication module that is configured to authenticate the request and selectively allow access to the data service provider. The present invention also provides a system for managing an access contract between a client and a data service provider. The system comprises a management module and a data service provider access object associated with the data service provider. The management module is configured to identify the client and assign use of the data service provider access object to the client for the duration of the access contract. In one embodiment, the management module notifies the client when the access contract expires or is about to expire.

The management module may cancel an assignment to the client after the access contract expires. In one embodiment, the management module is configured to identify another client having an access contract with the data service provider and reassign use of the data service provider access object to the another client for the duration of the access contract between the another client and the data service provider.

In one embodiment, the management module is also adapted to receive a request for content information, choose from a group of at least one data service provider access object, a data service provider access object that is adapted to access a data service provider associated with the request, and assign the chosen data service provider access object to the request.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF PREFERRED EMBODIMENTS

The present invention meets the need for a personalized approach to implementing portlets that can be tailored to different companies, business units and users. The portlet development system disclosed herein creates an operating environment for integrating enterprise processes. The invention provides tools and an architecture for creating operational task scenarios that are understandable to the average user and that may be invoked by human or machine processes as clients from various computing devices.

Building on current and emerging standards for data interchange, software componentization and information access, various embodiments of the system include portlet definition, web service invocation, and business process specification. In one embodiment, the system provides non-programmatic solutions, including both declarative and graphical tools, to the problem of composing and orchestrating enterprise-related task specifications. Automating application specifications is a challenging task, which is simplified by separating this task into manageable categories. To accomplish this, an architecture and methodology are used that utilize widely adopted industry standards and infrastructure technologies in a novel and useful way. To this end, the system provides tools that enable services and schemas to define and execute the aggregated components of a presentation specification for a presentation broker, a service request specification for an information broker, and a credential specification for a credential broker.

The system comprises various aspects, including presentation and framework, security, user management, personalization, content management, performance and scalability, search, and enterprise information connectivity features. In one embodiment, the system is an XML-driven enterprise process delivery engine having an architecture that unifies widely accepted internetworking technology standards into an operating framework that transforms declaratively generated specifications for data and process services, client presentation and user credentials into custom solutions.

Figure 1:
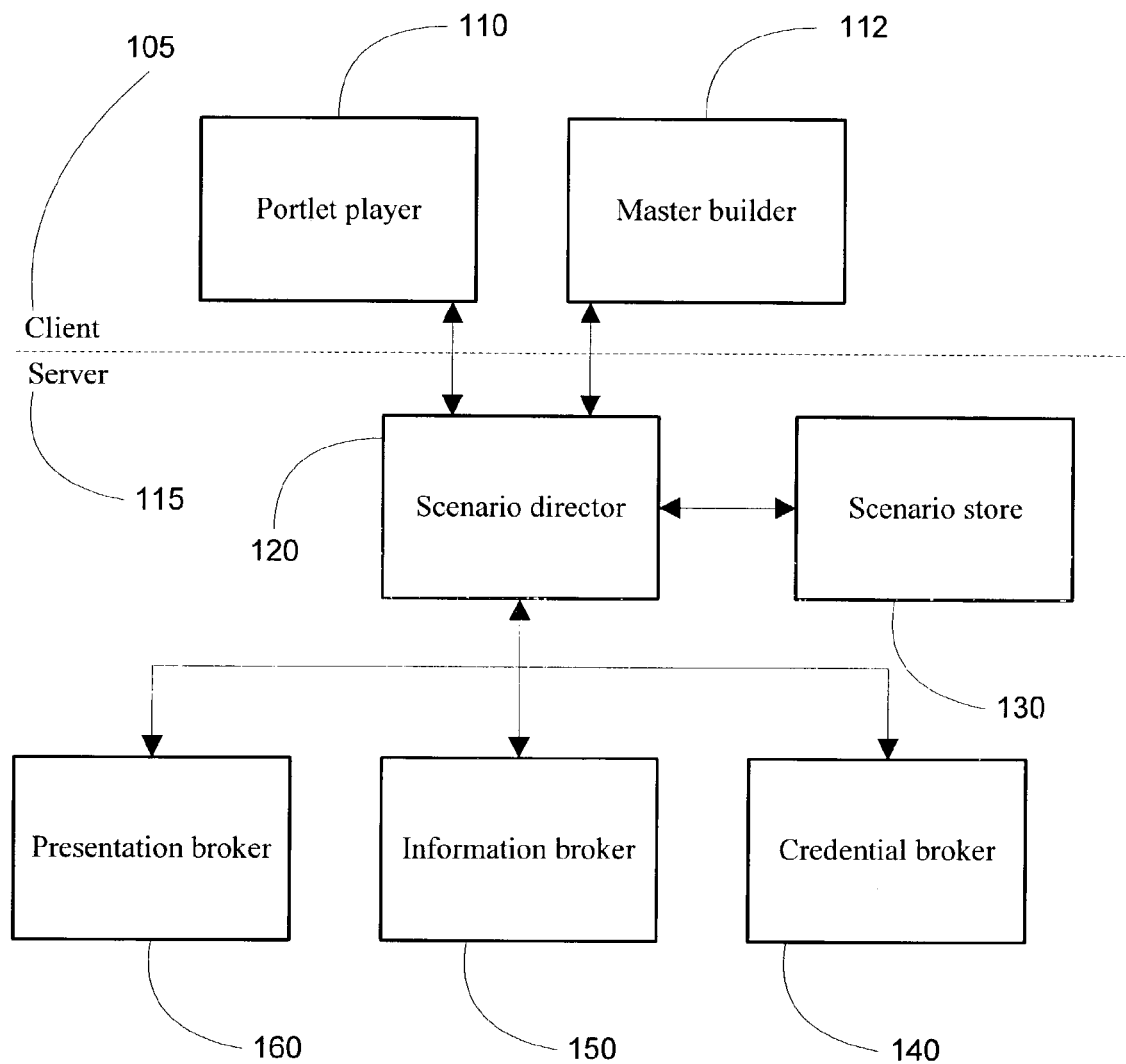
FIG. 1 is a block diagram presenting a configuration of hardware and software components according to one embodiment of the present invention.

Referring to FIG. 1, the architecture of the present invention may be based on a set of data classes and affiliated processing components. In one embodiment, the architecture defines four primary data classes that are called specifications and comprise the "scenario", the "service request", the "presentation", and the "credential". A scenario generically describes a set of desired services, the ordering of those services and delivery rules for the result. A scenario may contain one or more data classes, including another scenario. Requests, which may be in the form of XML messages, cause specialized objects of these types to interact with one or more of the scenario director 120 and enabling service components, identified as a information broker 150, presentation broker 160 and credential Broker 140.

Using a Graphical User Interface (GUI) tool, such as a master builder 112, a user modifies scenarios to customize or define portlets by navigating metadata catalogs and presentation objects available in a solution space that the master builder 112 provides. In one embodiment, the system stores the scenarios in scenario store 130. When invoked by a URL in a browser, for example, the scenario director 120 processes the scenario to retrieve content via the information broker 150 and present the results in the portlet player 110 to the authorized requester. In one embodiment, a GUI-based tool may be utilized such as the master builder 112 illustrated in U.S. patent application Ser. No. 10/051,802. However, the use of the term "master builder" herein does not necessarily require the master builder of U.S. patent application Ser. No. 10/051,802. Any compatible customization tool may be used as a master builder 112.

The master builder 112 may comprise a processing module that is executed by or within a content rendering application, such as a web browser, or may be a stand-alone executable. In one embodiment, the master builder 112, which may be resident on a client 105, comprises a portlet through which other portlets can be defined.

The portlet player 110 renders data that it receives from the scenario director 120. The scenario director 120 passes the portlet player 110 merged information comprising presentation information and content information. The portlet player 110 may be embedded in a container such as the hosted portlet. The portlet player 110 manages its own display space and, because it is not dependent on markup language limitations, may deliver a richer user experience that includes graphical controls, direct manipulation and drag and drop. In one embodiment, the portlet player 110 is maintained at a client 105. Alternatively, the master builder 112 and portlet player 110 may be resident on the same or different clients 105. Multiple master builders 112 or portlet players 10 may be located on one client or distributed across multiple clients 105.

The master builder 112 is the design studio for creating scenarios and specifications. Like the portlet player, the master builder 112 works together with the scenario director 120 to present a portlet to the user. This cooperation results in a plurality of specifications, collectively referred to as a scenario, being written to a database, which may comprise a scenario store 130. As noted above, specifications define the requirements for the presentation, content and credentials of a portlet. Collectively, these three specifications make up an overall scenario 210, which will be further discussed below with reference to FIG. 2. Scenarios may be formatted and stored in the scenario store 130 as XML data files according to associated XML schemas. In one embodiment, the service request or presentation definition are predefined by user specification(s) created with the master builder 112. The specified presentation information may be client-specified, default-specified, or other.

The portlet player 110 is typically executed on the client side 105 and is utilized by a user to invoke a scenario 210 by the scenario director 120, which in one embodiment resident on a server 115. The scenario director 120 receives a service request and retrieves a presentation definition from the scenario store 130, which may be in a memory, database, or other data store. In one embodiment, the scenario store 130 or other scenario and specification storage is on the client side 105. A user's personal parameter selections may be stored and available to users within their own portal space.

Figure 2:
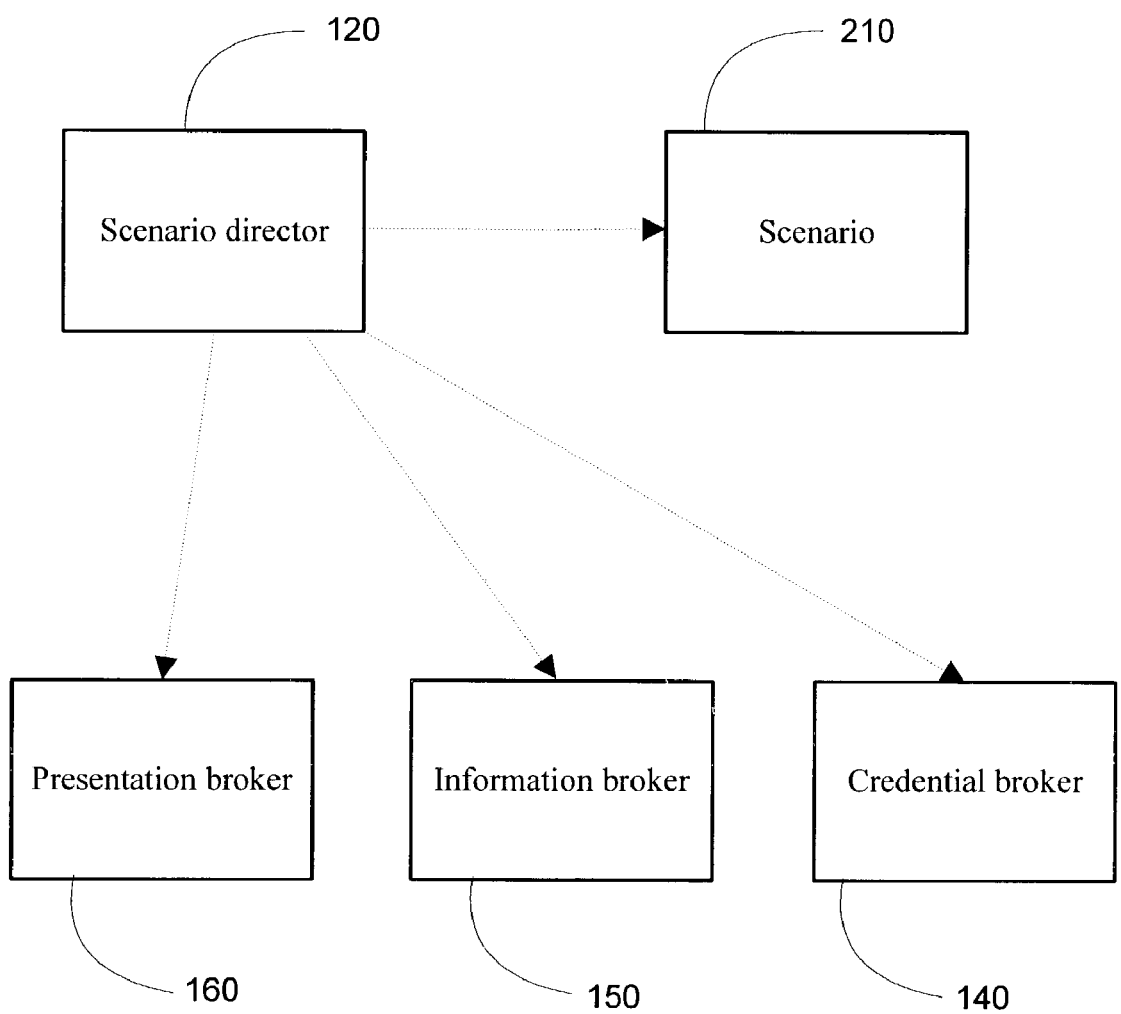
FIG. 2 is a package diagram presenting an embodiment of a scenario director with associated packages according to one embodiment of the present invention.

Referring to FIG. 2 a scenario director software module 120 is provided that is responsible for aggregating the resources of other components or modules to execute a scenario 210. The scenario director 120 may comprise specialized submodules to handle different communication technologies or protocols such as an HTTP servlet interface, for example, or other specialized protocol or access mechanism. The scenario director 120 executes a scenario 210 and uses the scenario's various constituent specifications to implement the enabling package components of the presentation broker 160, information broker 150, and credential broker 140. In one embodiment, the scenario 210 comprises a collective specification outlining the various enabling components and enabling component specifications including presentation, data access and retrieval, and process flow for a defined process such as portlet or web service.

The scenario director 120 is responsible for directing the enabling components 140, 150 and 160 services to execute a scenario 210. The scenario director 120 can manage multiple scenarios 210 for presentation to multiple clients in parallel. Because the enabling service components are self-sufficient, a well-defined task may be invoked directly by an arbitrary client through a specification, for example, a WSDL-compliant service request to the information broker 150. In this way, a "facsimile" director module 120 may entirely replace the scenario director 120 or other director module. Each enabling service component, such as the information broker 150 or presentation broker 160, is self-sufficient in servicing requests with respect to its domain of responsibility. Thus, a well-defined task may be invoked directly by an arbitrary client through a corresponding specification. For example, a service request can be sent directly to an independent information broker 150. In one embodiment, such a service request is WSDL-compliant. In one embodiment, the enabling components 140,150 and 160, are swappable to thereby allow alternate content-retrieving modules to or retrieve alternative data or to provide alternate functionality while still maintaining compatibility.

The architecture may define multiple specification classes in the form of XML schemas comprising a scenario 210, the primary specification, a presentation specification, a service request, a credential specification, and a sequence. In one embodiment, a sequence is an addressable unit combining a service request and its presentation. Objects of these types may interact with the scenario director 120, information broker 150, presentation broker 160 and credential broker 140 packages.

To summarize thus far, the scenario director 120 aggregates system services and orchestrates the playback of a scenario 210. The presentation broker 160 provides a service for merging presentation information of a display specification and the requested content information into merged information to present a portlet to a given client type. The information broker 150 comprises an enabling service that supplies requested content information results based on a service request. An authentication module, referred to as a credential broker 140, comprises an enabling service that maps known users, via a trusted token, to the system's secured resources. The portlet player 110 renders portlets and enables behaviors, while the master builder 112 provides the tools for creating specifications.

While in some embodiments the system may be used to create declarative portlets and serve those portlets to the user of an enterprise portal, other embodiments contemplate a scenario 210 not limited to defining portlets. A scenario 210 generically describes a set of desired services, the ordering of those services and delivery rules for the result. Moreover, the delivery rules need not refer to a human controlled end-point. The presentation information may define data mapping from XML into some other structured or record-oriented scheme for direct use, for example, by another machine process, remote host, or application.

In addition to portlets, the invention is extensible to allow for the declarative creation of mobile applications and the orchestration of web services. Web services are self-contained, self-describing, modular applications that can be published, located, and invoked across a computer network, such as the Internet. Web services provide callable functions that may comprise anything from a simple request to complicated business processes, for example, web retailer's "shopping cart".

The credential broker 140 is an authentication module responsible for policy enforcement and security. Standard or other widely adopted trusted token schemes, such as Lightweight Third Party Authorization (LTPA) or secure cookies as implemented by the serving platform (e.g., WPS-based portals), are utilized to provide the client level authorization necessary to run portlets. System level credential management may be implemented and maintained in the infrastructure whenever other suitable mechanisms are lacking. In one embodiment, the credential broker 140 is configured so that it may use, defer to, or be superseded by other standard policy enforcement APIs or products, such as the Java Authentication and Authorization Service (JAAS) and Policy Director. The credential broker 140 may also defer to an authentication scheme specific to and primarily managed by an individual data service provider associated with a given service request.

The credential broker 140 preferably maintains policy information about secured resources, such as databases, tables, ERP processes, etc. In one embodiment, the credential broker 140 provides a credential directory lookup service where the credential broker 140 accepts an authenticated user token from a client entry point, such as a portal, and associates that user token with a user's collection of available credentials. A single credential is mapped on a per-individual basis to secured resources, such as a data service provider. In one embodiment, such mapping is dynamically created at initialization time. In this manner, the exact mappings are interchangeable. For example, mapping may be interchangeable between Lotus Connectors for Java (LCJava) and Java Database Connectivity (JDBC). In other embodiments, the credential broker 140 has pass-through functionality deferring to the authentication services of one or more software components or modules comprising the requesting environment and back-end systems, such as a DSP authentication system. The credential broker 140 associates the token with an individual's collection of published credentials.

Figure 3:
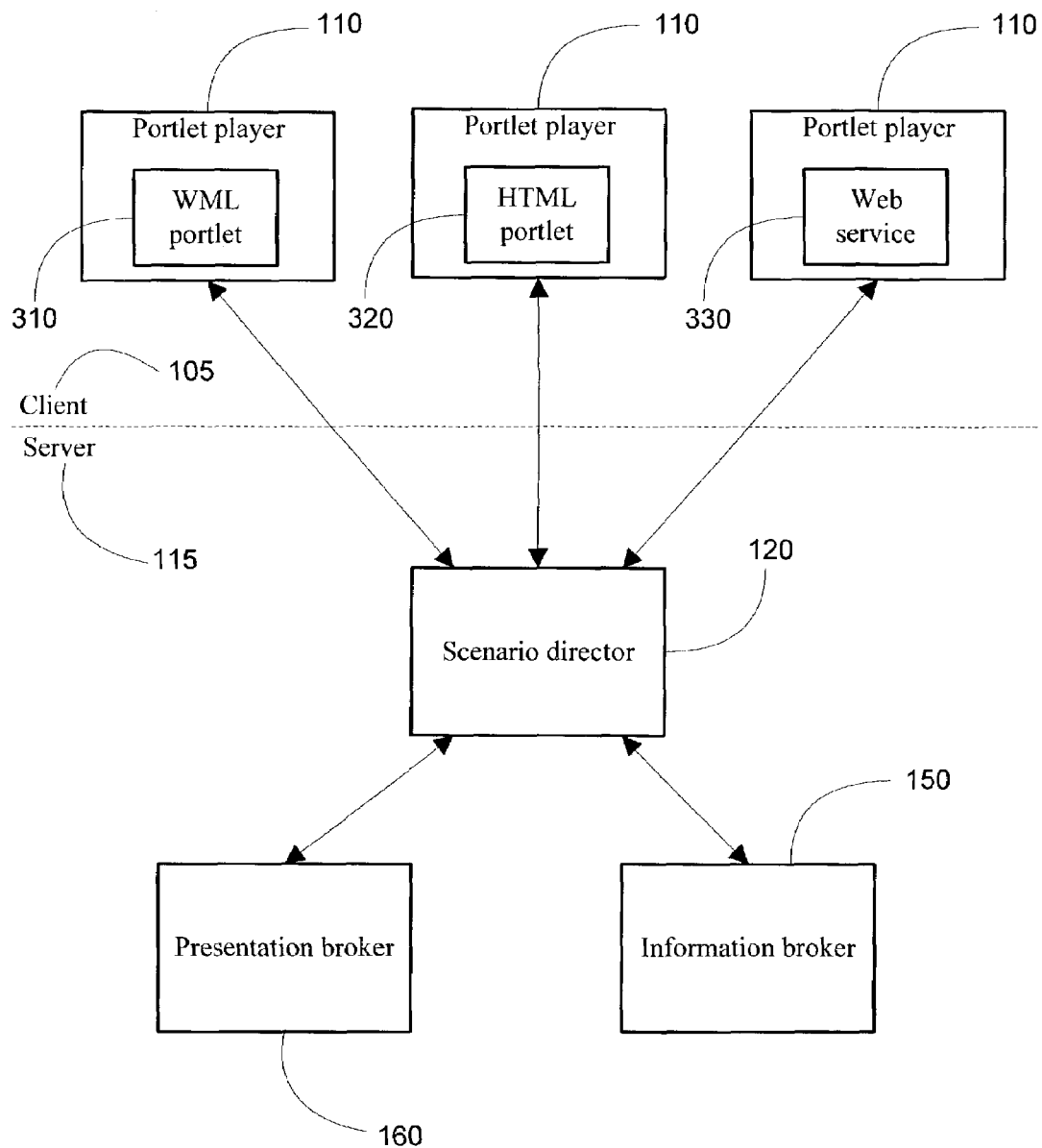
FIG. 3 is a block diagram presenting an embodiment of the connectivity between a presentation broker and portlet player(s) according to one embodiment of the present invention.

Referring to FIG. 3, the presentation broker 160 provides client format transformation service that merges requested content information with specified presentation information. A single portlet, expressed as a scenario, may have several presentation specifications. The presentation broker 160 inspects the characteristics of a client's presentation definition and merges specified presentation information with service requested content information into merged information. In one embodiment, such merged information is in a client-compatible form, which is proper for rendering by the client on a display device.

In one embodiment, the presentation broker 160 and scenario director 120 are adapted to communicate in parallel with a plurality of clients or a plurality of portlet players 110 in different or the same formats. Furthermore, the portlet player 110 is adapted to render content according different formats and applications. For example, one embodiment of a portlet player 110 is adapted to render a Hypertext Markup Language (HTML) portlet 320, whereas another portlet player 110 is configured to render a Wireless Mark-Up Language (WML) portlet 310. The particular presentation to apply may be derived dynamically by caller supplied device characteristics. In this way, a single portlet can be served as needed to an HTML-based browser or WML-compatible wireless device.

The portlet player 110 may also be configured to act as a conduit for web services 330. Web services 330 are self-contained, self-describing, modular applications that can be published, located, and invoked across the Internet, an Intranet, a wireless network, a LAN, or any other network. Web services 330 provide callable functions that comprise services ranging from a simple request to complicated business processes, such as for example, web retailer's "shopping cart". In one embodiment, a portlet player 110 can be used to act as a conduit or render for a web service 330 as part of or in addition to a portlet.

The scenario director 120 is adapted to present merged information to any portlet player 110 in a format compatible with the device presenting the portlet. Such information is created from merging the content information retrieved by the information broker 150 with the presentation information. The presentation broker 160 comprises a plurality of presentation-related software modules. In one embodiment, presentation broker 160 comprises a device detection object comprising the device-centric interpreted results of playing scenario 310. In an alternative embodiment, the particular presentation to apply is derived dynamically by caller-supplied device characteristics. For example, the appropriate presentation vehicle may be determined at runtime in accordance with the properties of the requesting client device. This is extended to include the ability of the product of a specification to be invoked on behalf of another process such as a web service invocation with the product to be delivered as result-only structured data. The presentation of the product of a given task specification, for example, that of a portlet, may optionally allow itself to be configured for different client devices dynamically. For example, a portlet may have alternate presentation specifications for both a standard desktop browser client and a hand-held device.

In one embodiment, the presentation broker 160 may comprise a software module that defines the physical form and layout of the presentation, which may be rendered as part of the GUI on a display. The presentation broker 160 may also include a personality software module, which comprises a device-specific profile with content fields and a personality type, e.g., handheld device, web browser, etc.

Continuing with FIG. 2, the information broker 150 comprises a content-retrieving module that facilitates access to service requested content information from data service providers. Data service providers include, for example, ERP systems such as SAP and PeopleSoft™. Many enterprises rely on ERP systems to maintain critical data and functional processes that operate the business. The information broker 150 may be utilized to open, assign and manage connections to enterprise data resources such as ERP systems. As used herein, a "data service provider" should be given its broadest possible meaning. Data service providers include any data source that is adapted to provide content, including for example, web services, database information, ERP information, web-site or Internet information, intranet information, etc.

The information broker may also be utilized to structure and execute data operations, e.g., queries, updates etc. as described in a Service Request. In one embodiment, standards based Java technology, such as JDBC or J2EE Connector Architecture, for example, are used. According to various embodiments, the content-retrieving module may work together with the presentation module, an authorization module or as a self-sufficient module.

Figure 4:
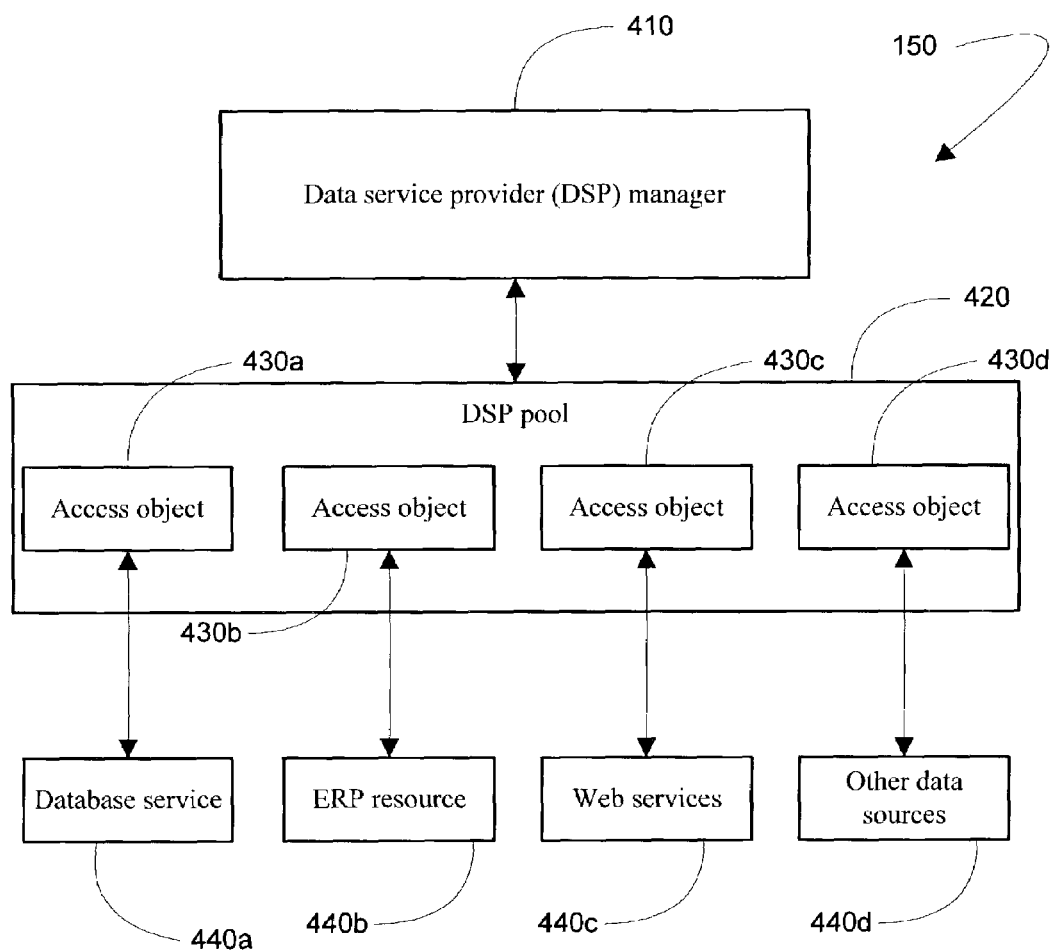
FIG. 4 is a block diagram presenting an information broker according to one embodiment of the present invention.

Turning to FIG. 4, the information broker 150 may provide facilities such as pooling and reusing data service provider connections. In one embodiment, the information broker 150 comprises a data service provider (DSP) manager 410 and a DSP pool 420, comprising at least one DSP access object 430. The information broker 150 provides a data brokering service for requested content information and the DSP manager 410 orchestrates the process of accessing or retrieving content from the multiple data service providers 440. The DSP manager 410 manages the resources of the DSP pool 420, including in one embodiment, the allocation and management of the pluggable DSP access objects 430 to data service providers 440. The pluggable DSP access objects 430 can be used to access ERP resources 440*b*, such as SAP™, relational and other database services 440*a*, such as IBM's DB2™, or web services 440*c*. The information broker 150 may also access other content information sources 440*d*, such as the Internet or an intranet source, for example. In one embodiment, DSP access objects 430 may exist remotely from the DSP manager 410, such as on a computer remote from the computer hosting the DSP manager 410. Each DSP access object 430 is associated with at least one compatible data service provider 440.

The DSP manager 410 can manage multiple heterogeneous DSP objects 430. The DSP manager 410 assigns a DSP access object 430 to a given service request when a service request's profile is compatible with a DSP access object 430 that is available in the DSP pool 420. A scenario 210 may thus utilize any number and type of data service providers 440 via DSP access objects 430. For example, a portal or portlet can be constructed with content information requested from various combinations of SAP™, PeopleSoft™, DB2™, and other network sources, such as a web service, Internet or intranet site.

Figure 5:
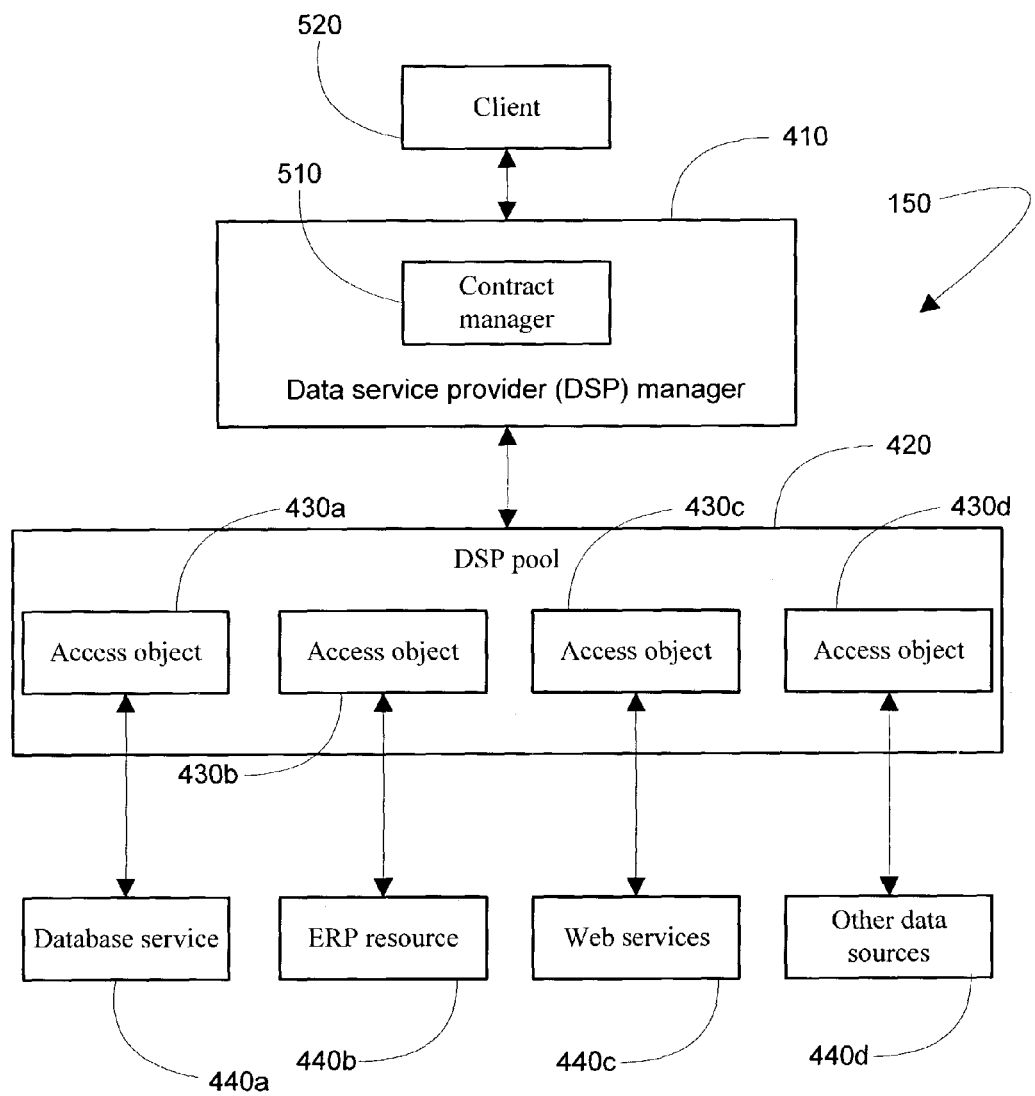
FIG. 5 is a block diagram presenting an information broker according to an alternative embodiment of the present invention.

FIG. 5 presents an alternative embodiment of the information broker in conjunction with a contract manager 510. The interaction between a client and a data service provider 440 may be bound in the context of a contract, agreement, etc. A contract represents a commitment on the part of the data service provider 440 to maintain the resource assignment for as long as the contract remains in force. In this embodiment, the information broker 150 is responsible for aging assigned contract connections and cleaning up orphaned contract connections. Such connections may comprise the pluggable DSP object 430 associated with the contracted data service provider 440.

A contract manager 510 may alternatively age active contracts according to a defined assignment duration. In one embodiment, the contract manager may also notify the client 520 when a contract is about to expire. A client 520 may renew its contract an unlimited number of times and clients may have an arbitrary number of active contracts. In one embodiment, an expired contract causes the contract manager 510 to free the resources committed to the contract, allowing the assigned DSP access object 430 to become available once again in the DSP pool 420. The DSP access object 430 is then available for reassignment by the DSP manager 410 or other management module to another client.

A contract may expire because the client 520 notifies the data service provider to terminate it or because the client 520 is no longer acknowledging data service provider renewal inquiries, which would indicate an orphaned DSP source 440. In one embodiment, the contract manager 510 identifies an expired contract and frees up DSP resources when attempting to obtain requested data from a DSP source 440 that indicates a terminated contract. In one embodiment, the contract manager 510 asynchronously monitors each contract in its contract list. When the contract manager 510 detects a contract that is up for renewal, the contract manager 510 arranges contact with the client 520 to renew to contract.

Figure 6:
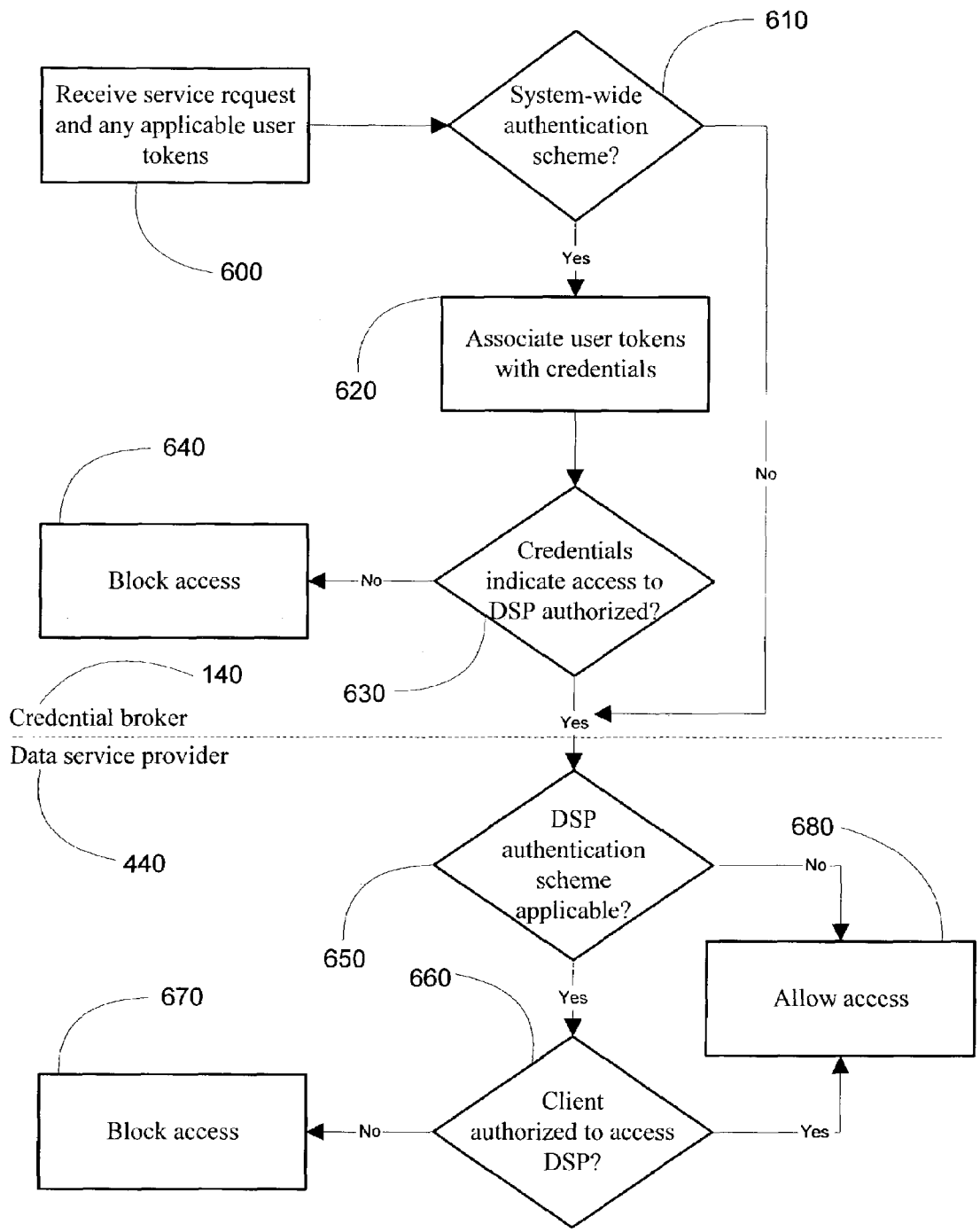
FIG. 6 is a flow chart presenting an embodiment of an authentication method according to one embodiment of the present invention.

FIG. 6 presents one possible method of authentication. At step 600, the credential broker 140 receives a service request and any applicable user tokens. At step 610, the credential broker 140 or other authentication module checks the user token to see if a system-wide method of authentication, primarily managed by the credential broker 140 for example, is to be implemented. If not, the method proceeds to step 650, which will be further discussed below. If the check evaluates to true, the credential broker associates the user tokens with client-associated credentials at step 620. At step 630, the credential broker uses the credentials to determine if the client is authorized to access the data service provider associated with the request. If the credential broker at step 630 does not permit access, then access to the requested data service provider content is blocked at step 640. If the credential broker at step 630 permits access, then the method proceeds to step 650 where access may still be disallowed at the data service provider.

At step 650, the data service provider may or may not apply an authentication scheme that is specific to that data service provider associated with the service request. If an authentication scheme does not apply, then the method proceeds to step 680 where the data service provider allows access. If an authentication scheme does apply, then at step 660, the data service provider determines if the client is authorized to access the requested content at the data service provider. If the client is not authorized, then access is disallowed at step 670. Otherwise, the data service provider at step 680 allows access.

Advantageously, the credential broker 140 enables single sign-on (SSO) to thereby relieve the user from repeated authentication while maintaining the portal's integrity as it extends its reach into enterprise systems. Single sign-on only requires the user to enter a single username or password at the initiation of a session. The SSO functionality authenticates the user so the user may access all the applications to which they have been given rights and eliminates future authentication prompts when the user switches applications during the session.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A method for facilitating development of a customizable portlet, the method comprising:
   receiving a request for enterprise content information and a username, password and token from a given client;
   identifying the given client's parameter selections associated with a given portlet;
   associating the token with a set of one or more user credentials using a credential broker;
   if the user credentials indicate that access is unauthorized, blocking transmission of the service request to a data service provider corresponding to the request; and
   if the user credentials indicate that access is authorized, negotiating a contract between the given client and the data service provider, the contract, based on the username, password and token, defining at least one parameter establishing a session length and at least one parameter operative to maintain a resource assignment for a given client;
   if the user credentials indicate that access is authorized, allowing transmission of the service request to a data service provider corresponding to the request and merging presentation information with the requested enterprise content information to form merged information, the presentation information being based on the given client's parameter selections; and
   rendering the merged information on a client computing device as the customizable portlet.

2. The method of claim 1 comprising receiving requested content information from a swappable content-retrieval module.

3. The method of claim 1 utilizing the presentation information to customize the merged information to be rendered in the customizable portlet.

4. The method of claim 1 comprising merging default information with the merged information.

5. The method of claim 1 comprising rendering the customizable portlet in an HTML-based browser.

6. The method of claim 1 comprising rendering the customizable portlet in a WML-based browser.

7. The method of claim 1 comprising ascertaining at run-time a rendering application used to render the merged information in the customizable portlet on properties of an associated client.

8. The method of claim 1, comprising allowing a data service provider to reject a request for content information where the data service provider determines that a client is unauthorized.

9. A system for facilitating development of a customizable portlet, the system comprising:
- a content retrieval module operative to retrieve enterprise content requested and a username, password, and token by a given client;
- a presentation module configured to receive client parameter selections associated with a given portlet;
- a credential module configured to receive a request for content information and a token from a user, associate the token with user credentials, and selectively block transmission of the request to a corresponding data service provider based on whether the user credentials indicate access is unauthorized;
- a contract manager operative to negotiate a contract between the given client and the data service provider, the contract, based on the username, password and token defining at least one parameter establishing a session length and at least one parameter operative to maintain a resource assignment for a given client; and
- a director module operative to provide the presentation module with the requested enterprise content from the content-retrieval module;

wherein the presentation module is operative to merge the requested content and presentation information based on the client parameter selections to form merged information configured to be rendered on a client computing device as the customizable portlet.

10. The system of claim 9 wherein the presentation information comprises client specified presentation information.

11. The system of claim 9 wherein the presentation information comprises default presentation information.

12. The system of claim 9 wherein the merged information is configured to be rendered in an administration screen.

13. The system of claim 9, wherein the merged information is configured to be rendered in an HTML based browser.

14. The system of claim 9, wherein the merged information is configured to be rendered in a WML compatible browser.

15. The method of claim 9, wherein the presentation module is configured to ascertain at run-time a rendering application used to render the merged information based on properties of an associated client.

16. The system of claim 9, comprising a data service provider configured to reject a request for content information when the data service provider identifies that user access is unauthorized.

* * * * *